United States Patent [19]
Fernandez et al.

[11] Patent Number: 5,518,832
[45] Date of Patent: May 21, 1996

[54] APPARATUS FOR SIMULATING HIGH BATTERY TEMPERATURE USED IN RECHARGING LITHIUM ION CELLS

[75] Inventors: Jose M. Fernandez, Lawrenceville, Ga.; Michael W. Houghton, Grayslake; Matthew M. Nakanishi, Mundelein, both of Ill.

[73] Assignee: Motorola, Inc., Schaumburg, Ill.

[21] Appl. No.: 370,053

[22] Filed: Jan. 9, 1995

[51] Int. Cl.$^6$ .................................................. H02J 7/00
[52] U.S. Cl. .................... 429/49; 320/4; 320/31
[58] Field of Search .................. 429/7, 49; 320/4, 320/31

[56] References Cited

U.S. PATENT DOCUMENTS 4,513,238  4/1985  Orban ........................................ 320/23
5,017,856  5/1991  Johnson ...................................... 320/2

*Primary Examiner*—John Niebling
*Assistant Examiner*—Brendan Mee
*Attorney, Agent, or Firm*—Kenneth M. Massaroni; Scott M. Garrett

[57] ABSTRACT

A battery (200) includes a device (201) used for simulating a high temperature condition of a thermistor (216) located in battery (200). The battery (200) includes a charging node (203), temperature node (205) and ground node (207). A control circuit (209) is used with lithium ion cell (211) to measure voltage of lithium ion cell (211). Control circuit (209) produces a control signal when a desired voltage is reached during recharging. The control signal works with a high voltage switch (217), thermistor (216), diode (213) and resister (215) to control the voltage on temperature node (205). Any change in voltage on temperature node (205) may then be detected by an attached charging system to allow it to change its mode of operation.

10 Claims, 2 Drawing Sheets

APPARATUS FOR SIMULATING HIGH BATTERY TEMPERATURE USED IN RECHARGING LITHIUM ION CELLS

CROSS REFERENCE TO RELATED APPLICATIONS

This application is related to co-pending applications, Ser. No. 08/364,582, entitled "Apparatus and Method of Simulating High Battery Temperature In A Rechargeable Battery", Ser. No. 08/357,891 entitled "Apparatus and Method of Providing an Initiation Voltage To A Rechargeable Battery System", Ser. No. 08/364,583 entitled "Apparatus For Simulating High Battery Temperature for Rechargeable Battery Systems" and assigned to Motorola, Inc.

TECHNICAL FIELD

This invention relates in general to battery recharging and more particularly to systems for rechargeable battery cells.

BACKGROUND

An increasing number of portable electronic products are available today which operate on a battery source within the device. These products include such things as cellular telephones, portable radios, pagers and voice recorders which are conveniently mobile and operate using rechargeable batteries. Many different battery chemistries have been used for many years which meet the need for recharging capability. Probably the most popular chemistries include nickel cadmium and nickel metal hydride. A relatively new chemistry, however, generally referred to as lithium ion, enables a cell to be recharged while offering many advantages over other types of rechargeable cells. These benefits primarily are directed to low weight and overall size with a high energy density. One unique factor to be considered when using a lithium ion cell is its charging scheme. A lithium ion cell is not charged in the same manner as cells utilizing a nickel chemistry.

Nickel-cadmium and nickel metal hydride cells are typically charged using a rapid charge by applying a constant current until a certain event occurs. This event may be coupled to the cell reaching a predetermined high voltage, decreasing to a predetermined low voltage or an increase in the cell's temperature. This is in contrast with the lithium ion cell which requires a two step charging process to achieve optimum performance. The first step of this process provides that the battery charger apply a constant current level while the cell's voltage remains below a predetermined threshold. Once the voltage increases to that threshold, the second step insures the battery charger is held at the threshold voltage allowing the current to decrease. Once the current decreases sufficiently to a desired level, the lithium ion cell is fully recharged.

This two step process presents a problem when considering charging lithium ion cells in a charger designed for nickel systems. Generally, nickel system chargers apply only a constant current which allows the voltage of the cells to rise unimpeded. The voltage may rise to any level provided the battery does not become too hot, i.e. increase to a undesired and dangerous level. Once the nickel system battery becomes hot, the charger detects this state and switches from the rapid high current charge to a value of approximately 5–10% that of the rapid current value. This lower current mode is generally referred to as a trickle current or trickle charge. Hence, the charging scheme offered by current nickel system chargers will not properly charge a lithium ion cell. Should a lithium ion cell be placed or forced in to the nickel system charger the result could be potentially dangerous since the lithium ion cell could quickly overheat. Therefore, the need exists for a battery charging circuit or system which can be retrofitted to the control circuitry of an existing lithium ion cell allowing the cell to safely use a nickel system charger.

DETAILED DESCRIPTION OF THE PREFERRED EMBODIMENT

Figure 1:
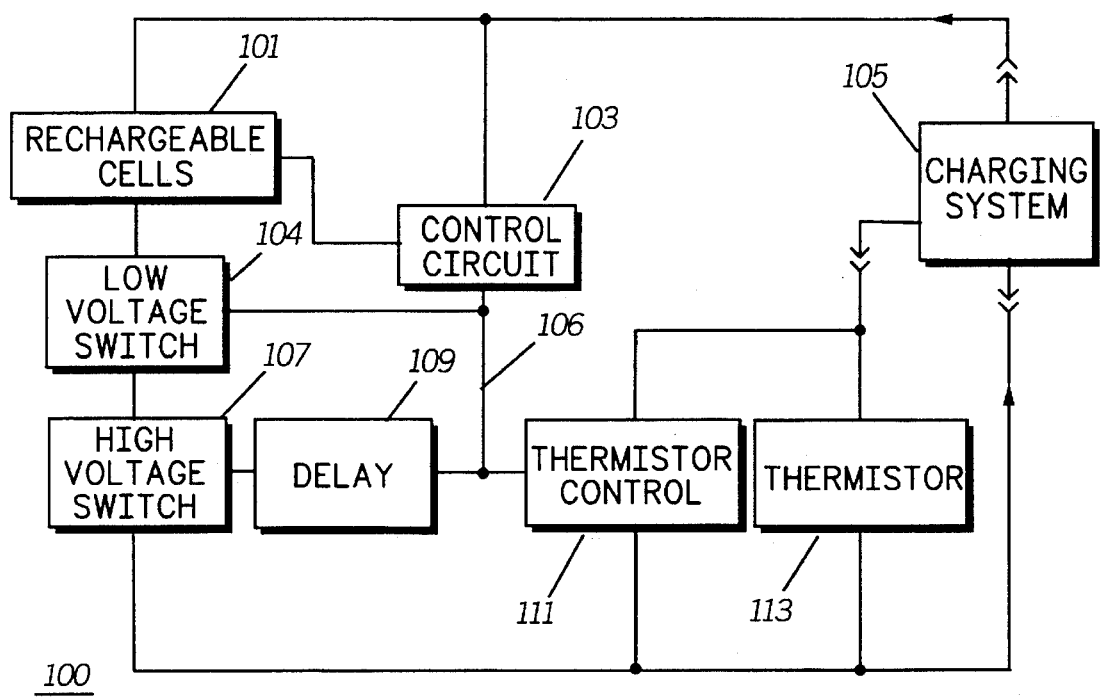
FIG. 1 is a block diagram showing operation of the high temperature simulator in accordance with the invention.

Referring now to FIG. 1, a block diagram depicting operation of a high temperature simulator for a rechargeable battery system which can simulate a high battery temperature condition is shown. The rechargeable battery may typically be one based on a lithium ion chemistry, lithium polymer chemistry or lead acid chemistry. The high temperature simulator allows a rechargeable battery to be charged using an alien charging system or charging network which generally has an incompatible charging scheme. An alien charging system may be one used with a nickel cadmium or nickel metal hydride type cells and has a first mode of operation and second mode of operation. The first mode of operation is generally a quick or fast mode while the second mode is a slower or trickle charge mode. These charging systems are generally referred to as nickel system battery chargers and are configured to charge nickel metal hydride or nickel cadmium cells.

As will be described in greater detail below, the preferred embodiment of the invention takes advantage of an inherent feature present with a nickel system battery charger. This feature insures that rapid charging of a rechargeable battery ceases when the appropriate control information is received from the battery. This control information is related to the battery's temperature during rapid charge. When the predetermined temperature is reached, the nickel system battery charger automatically switches to a low current or trickle charge state where the rechargeable battery can be charged more slowly.

A preferred embodiment of the invention shows battery 100 which includes a rechargeable cell 101. As indicated above, rechargeable cell 101 may be one or more cells with a lithium ion chemistry or the like. A control circuit 103 measures or observes the voltage of the rechargeable cell 101 while under charge by charging system 105. Charging system 105 is typically a charger used for nickel cadmium or nickel metal hydride cells. Control circuit 103 may be a comparator circuit or the like such as Motorola Integrated Circuit Model No. SC371013F/FER. Once control circuit 103 determines a predetermined voltage level or voltage potential has been reached, control circuit 103 produces a control signal on control line 106. The predetermined voltage is generally a selected voltage limit which is determined by the operational voltage of the rechargeable cell 101 and may depend on specific cell chemistry and/or associated charging algorithm.

The control line 106 is used to convey the control signal from control circuit 103 to each of low voltage switch 104, high voltage switch 107 and a temperature simulator device such as thermistor switch 111. Low voltage switch is used to disconnect rechargeable cell 101 in the event its voltage becomes too low, and thereby preventing damage to the cell. High voltage switch 107 and a delay circuit 109 are positioned in series with charging system 105 and are used to provide an open circuit after a desired delay period when a predetermined voltage is reached during charging. The delay period is used to allow charging system 105 to react to changes in current through temperature sensor or thermistor 113. Without the delay, charging system 105 may interpret the opening of high voltage switch 107 as rechargeable cell 101 being disconnected. Once this occurs, charging system 105 may turn itself off.

Thermistor switch 111 is attached to control circuit 103 and is also triggered by the control signal through control line 106 to provide a short circuit to thermistor 113. As is well known in the art, the resistive value or state of thermistor 113 changes in response to temperature changes of rechargeable cell 101. Thus, the current flowing through thermistor 113 changes in relation to the ambient environment in which thermistor 113 is exposed. This current flow is interpreted by the charging system 105 as a temperature value which it uses to determine when to switch charging modes. These modes are typically switched from a fast or rapid charge state, where charging rate is at a high level to a slower charge state where the charging rate is reduced. Thermistor switch 111 is attached to thermistor 113 and is controlled by control circuit 103. When actuated, thermistor switch 111 alters the current flow or state of thermistor 113. As indicated above, this increase in current through thermistor 113 is detected by charging system 105 as a high temperature condition. Thus, thermistor switch 111 acts as a control circuit to change the operational state of thermistor 113. Thermistor switch 111 then simulates a high temperature state of rechargeable cell 101. In response thereto, charging system 105 switches from a high rapid or substantially fast charge mode to a slow, low or trickle charge mode. Since rechargeable cell 101 was first allowed to charge to its predetermined voltage i.e. the first step of its charging scheme, the trickle charge mode now allows rechargeable cell 101 to be charged in accordance with the second step of its charging scheme. Once charging system 105 has switched to the lower current, the voltages of rechargeable cell 101 will drop slightly from their previous level due to internal resistance present within rechargeable cell 101. This lower level of current allows continued charging of the rechargeable cell while its voltage is below the threshold voltage level, until the cell becomes fully charged. However, charging using charging system 105 will generally take longer than if the ideal lithium ion charging regime were used.

Figure 2:
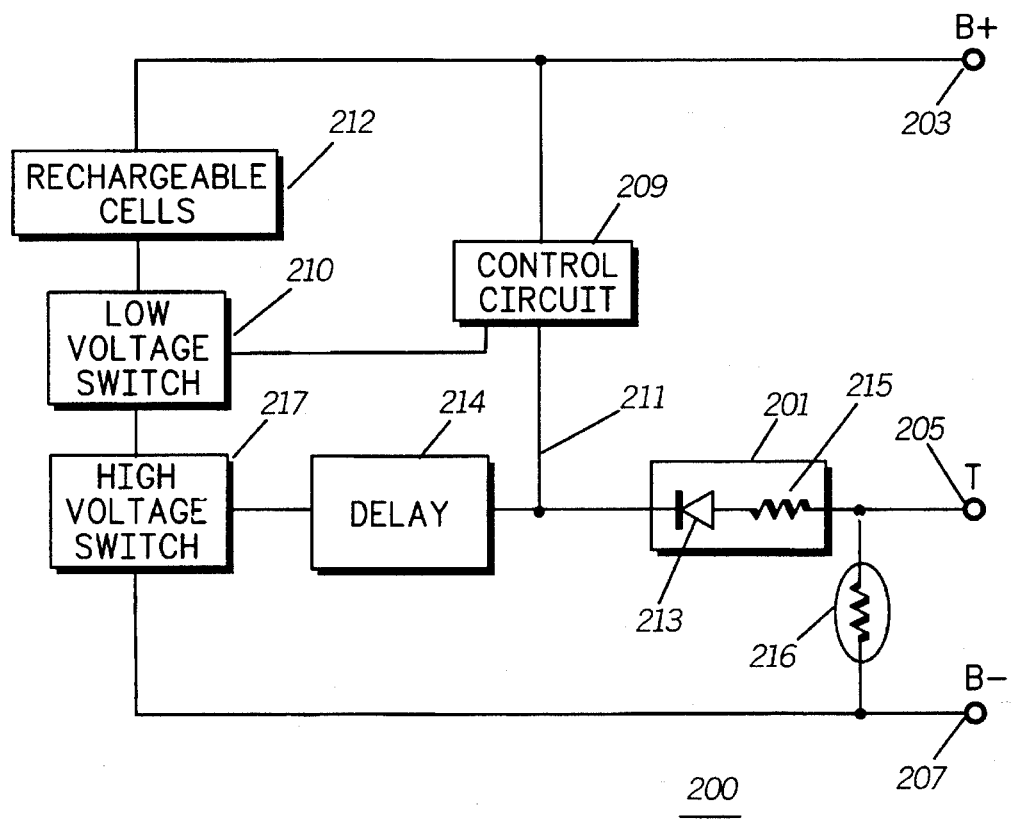
FIG. 2 is a partial schematic diagram in accordance with a preferred embodiment of the invention showing a high temperature simulator which is used when a high current source is available.

FIG. 2 illustrates a schematic representation of the high temperature simulator circuit 201 typically used in a rechargeable battery 200 where control circuit 209 can sink sufficient current to an isolated or virtual ground. As is seen in FIG. 2, rechargeable battery 200 typically includes a charging voltage node 203, a temperature node 205 and a virtual ground node 207. In operation, a charging voltage is connected to the charging voltage node 203 and virtual ground node 207. A battery charging system (not shown) measures temperature through temperature node 205 to determine when to change or switch operating modes. The battery charging system may be one designed for nickel cadmium cells, nickel metal hydride cells or the like. As indicated above, low voltage switch 210 is used to prevent rechargeable cells 211 from discharging below a selected value. Conversely, when control circuit 209 detects that rechargeable cell 212 has reached a predetermined high voltage during charging, it sends a control signal through control line 211 to high temperature simulator circuit 201 and high voltage switch 217 through delay 214. High temperature simulator circuit 201 is comprised of a diode 213 and resistor 215. When the control signal enables high temperature simulator circuit 201 and high voltage switch 217, it switches the voltage at temperature node 205 from a high level to virtual ground node 207. This has the affect of pulling or lowering the voltage on temperature node 205 to a low value since current is being sunk to virtual ground node 207. Thus, this lower voltage simulates a high temperature condition of thermistor 216. This is detected by the battery charging system on temperature node 205 as high temperature condition which enables it to switch modes. Although diode 213 could be used alone, resistor 215 is used to insure the voltage on temperature node 205 is not dropped to too low a value since certain varieties of battery chargers enter a test mode under these conditions.

Figure 3:
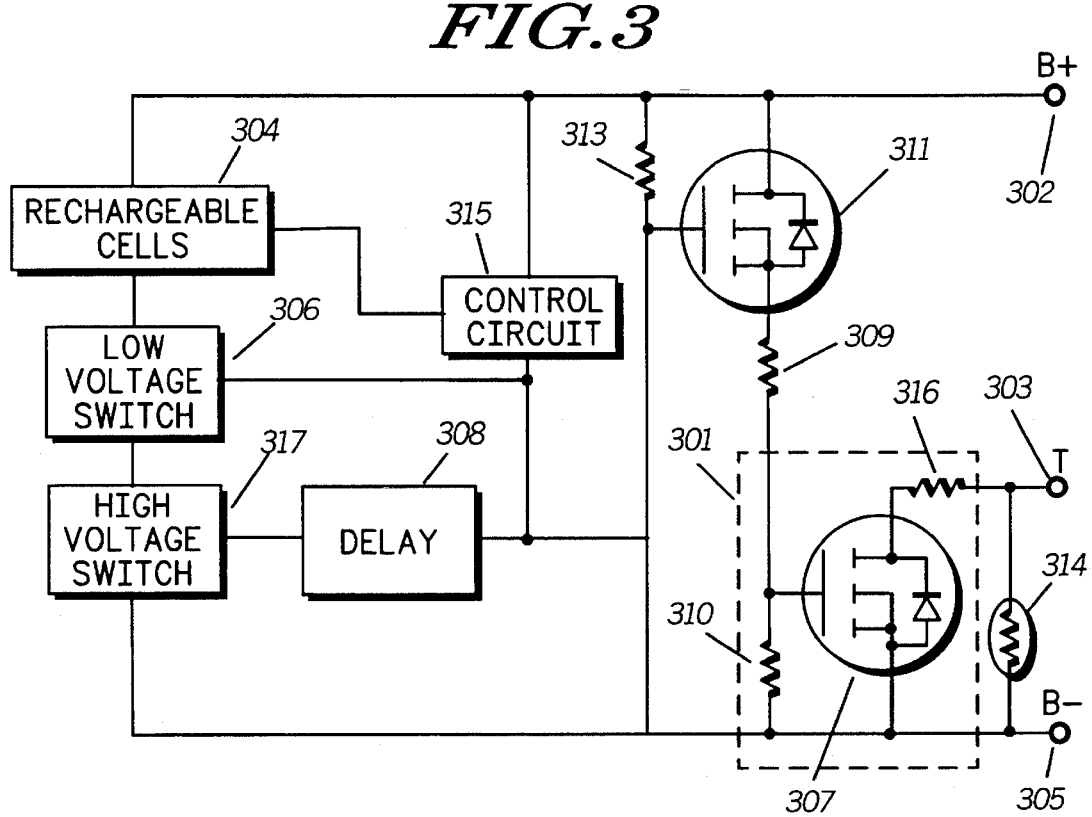
FIG. 3 is a partial schematic diagram in accordance with a preferred embodiment of the invention showing a high temperature simulator which is used when only a low current source is available.

FIG. 3 illustrates a schematic representation of the high temperature simulator circuit 301 typically used in a rechargeable battery 300 such as a lithium ion battery. High temperature simulator circuit 301 is used where control circuit 315 cannot sink a significant amount current to allow the circuit shown in FIG. 2 to be used. It should be evident to those skilled in the art the function and operation of the rechargeable cells 304, low voltage switch 306 and delay 308 are like that described in FIGS. 1 and 2 above. Rechargeable battery 300 utilizes a charging node 302, temperature node 303 and virtual ground node 305. The high temperature simulator circuit 301 is comprised of an N-channel MOSFET 307, resistor 309, resistor 310, P-channel MOSFET 311 and resistor 313. In operation, when control circuit 315 actuates high voltage switch 317, this biases the gate-source junction of P-channel MOSFET 311. Resistor 313 is used to pull up or increase the voltage on the gate of N-channel MOSFET 307 if control circuit 315 should fail. Resistor 313 is of a sufficiently high resistance to allow only a negligible current flow through it from charging node 302 when a control signal is enabled from control circuit 315. This causes P-channel MOSFET 311 to become a low resistance value and current flows through P-channel MOSFET 311, resistor 309 and resistor 310. The resulting voltage produced also biases N-channel MOSFET 307 into a low resistance state switching it to an on state. Once N-channel MOSFET 307 is switched on, resistor 316 acts to drop voltage on temperature node 303 sufficiently to indicate or simulate to a battery charging system (not shown) that a high temperature condition exists. The voltage at temperature node 303 is dropped low since the current passing through this node is directed or sunk to virtual ground node 305. Thus, the voltage measured across thermistor 314 is simulated using high temperature simulator circuit 301. The configuration shown in FIG. 3 may only be used if control circuit 315 cannot handle excessive current it must sink from an attached charging system. The circuit shown in FIG. 3 is more complex however it has the advantage of low current since only a negligible amount of current flow through resistor 313 when a control signal is enabled from control circuit 315.

Figure 4:
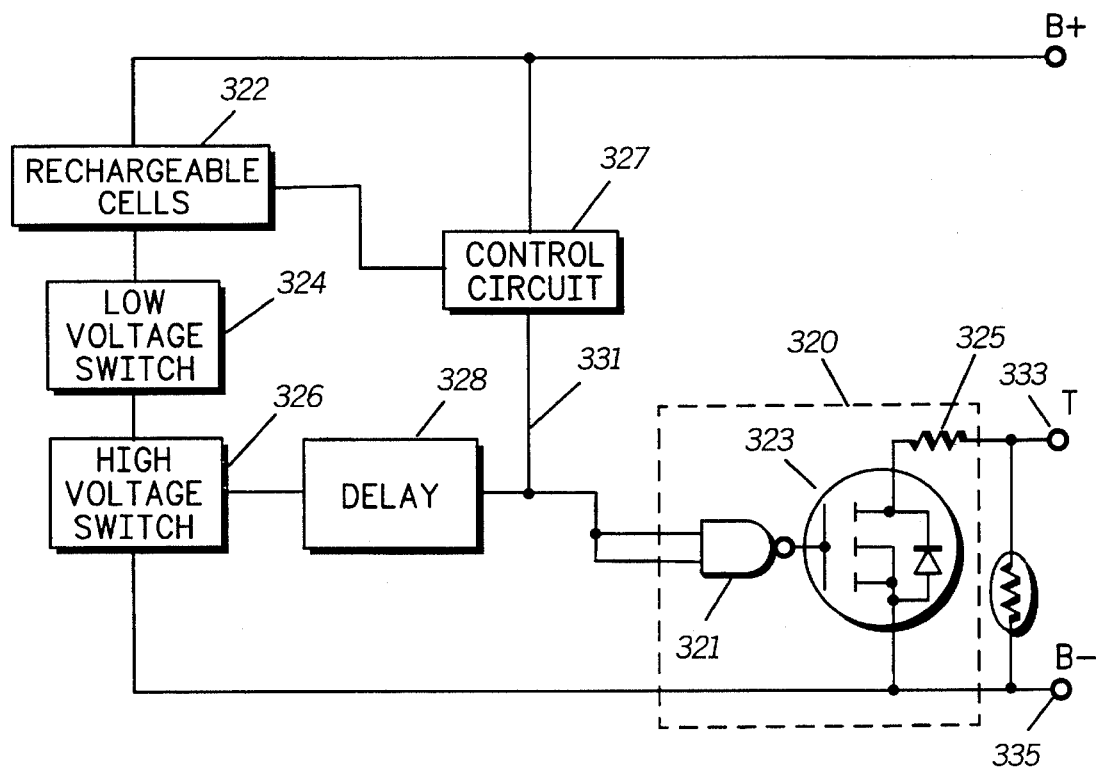
FIG. 4 is a partial schematic diagram in accordance with a preferred embodiment of the invention showing an alternative embodiment of a high temperature simulator to that shown in FIG. 2.

FIG. 4 illustrates a schematic representation of a high temperature simulator circuit 320. High temperature simulator circuit 320 is an alternative embodiment to that shown in FIG. 2 where a high current source from an attached charging system is available. It should be evident to those skilled in the art the function and operation of the rechargeable cells 322, low voltage switch 324, high voltage switch 326 and delay 328 are like that described in FIGS. 1, 2 and 3 above. In the preferred embodiment, high temperature simulator circuit 320 includes an inverter gate 321, P-channel MOSFET 323 and resister 325. In operation, like the other embodiments above, when control circuit 327 detects a high voltage condition in cells 329, a control signal is emitted on control line 331. This pulls or lowers the voltage on control line 331 to a low state which also controls the input of inverter gate 321 low. This biases P-channel MOSFET 323 turning it on. When P-channel MOSFET is turned on this pulls or lowers the temperature node 333 to a low state since temperature node 333 is effectively connected to virtual ground node 335. The value of resister 325 is used to control and/or select the desired temperature level that is interpreted by an attached battery charging system. Thus, an attached battery charging system which is connected to temperature node 333 detects a high temperature in view of the low voltage on this node. High temperature simulator circuit 320 acts to simulate or create a false high temperature condition.

The preferred method of practicing the invention includes charging a rechargeable battery with a charging apparatus having a first mode of operation and second mode of operation whose charging scheme is incompatible with the rechargeable cell within said rechargeable battery. The steps include applying a charging current from the charging apparatus to the rechargeable cell. Detecting a voltage potential of the rechargeable cell. Measuring the temperature of the rechargeable cell using a temperature sensor and sending a control signal from a first control network to a second control network when a predetermined voltage potential is reached to allow the temperature sensor to simulate a high temperature to the charging apparatus. Finally, sensing a simulated high temperature of the charging apparatus to change from said first mode of operation to the second mode of operation allowing the rechargeable cell to charge at a slower rate.

Thus, hot battery simulator apparatus and method disclosed will enable a new generation of lithium cell chemistries to be used without the burden of the consumer having to purchase a special charger to accommodate and recharge these rechargeable cells such as lithium ion cells. This will more greatly enhance the benefits and advantages of utilizing lithium based cells keeping overall cost low as opposed to buying a completely new charger and batteries for any desired application.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A retrofitable device used with a lithium ion battery for allowing said lithium ion battery to be used with a charging system used with cells utilizing a nickel based chemistry, said charging system including a charging node for receiving a charging voltage, control node for conveying temperature data and a ground node, said device comprising:

at least one lithium ion cell attached to said charging node;

a means for controlling attached to said at least one lithium ion cell for measuring the voltage potential of said at least one cell;

a means for switching attached to said means for controlling for preventing said at least one lithium ion cell from rising above a predetermined voltage;

a thermistor attached between said control node and a ground potential for receiving said temperature data of said at least one lithium ion cell; and a diode and resistor serially connected between said thermistor and said means for controlling for lowering a voltage on said control node to simulate a high temperature condition of said at least one lithium ion cell allowing said charging system to change modes.

2. A retrofitable device as in claim 1 further comprising: a means for delaying attached to said means for switching for delaying actuation of said means for switching by said means for controlling.

3. A retrofitable device as in claim 1 wherein said means for switching connects said temperature node with said ground node.

4. A battery including a device used for simulating a high temperature condition of a thermistor located in said battery, said battery including a charging node, temperature node and ground node, said battery comprising:

a lithium ion cell;

a control circuit for measuring a voltage of said lithium ion cell and producing a control signal;

a thermistor for determining the temperature of said lithium ion cell; and a diode and resistor pair for controlling current flowing through said temperature node to simulate a high temperature of said lithium ion cell.

5. A device as in claim 4 wherein said thermistor is connected between said temperature node and said ground node.

6. A device as in claim 5 wherein said diode and resistor pair are connected to serially between said control circuit and said thermistor.

7. A device as in claim 4 further comprising at least one switch controlled by said control circuit for disconnecting said lithium ion cell from a charging system when a predetermined voltage is reached.

8. A device as in claim 7 wherein said at least one switch is controlled by said control signal.

9. A device as in claim 8 wherein said at least one switch connects said temperature node to said ground node.

10. A device as in claim 9 further comprising a delay means serially connected to said control circuit for delaying actuation of said at least one switch by said control signal.

* * * * *